(12) United States Patent
Dykstra et al.

(10) Patent No.: US 10,577,876 B2
(45) Date of Patent: *Mar. 3, 2020

(54) ESTIMATING DRILLING FLUID PROPERTIES AND THE UNCERTAINTIES THEREOF

(71) Applicant: Halliburton Energy Services, Inc., Houston, TX (US)

(72) Inventors: Jason D. Dykstra, Spring, TX (US); Zhijie Sun, Spring, TX (US); Xiaoqing Ge, The Woodlands, TX (US); Yuzhen Xue, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 386 days.

This patent is subject to a terminal disclaimer.

(21) Appl. No.: 15/323,816

(22) PCT Filed: Jul. 13, 2016

(86) PCT No.: PCT/US2016/042000
§ 371 (c)(1),
(2) Date: Jan. 4, 2017

(87) PCT Pub. No.: WO2017/011505
PCT Pub. Date: Jan. 19, 2017

(65) Prior Publication Data
US 2017/0204689 A1    Jul. 20, 2017

Related U.S. Application Data

(60) Provisional application No. 62/191,675, filed on Jul. 13, 2015.

(51) Int. Cl.
*E21B 21/06* (2006.01)
*E21B 49/00* (2006.01)
(Continued)

(52) U.S. Cl.
CPC ............ *E21B 21/062* (2013.01); *E21B 21/08* (2013.01); *E21B 47/024* (2013.01);
(Continued)

(58) Field of Classification Search
None
See application file for complete search history.

(56) References Cited

U.S. PATENT DOCUMENTS

| | | | |
|---|---|---|---|
| 3,301,323 A | 1/1967 | Parsons | |
| 8,839,668 B2 * | 9/2014 | Hemsing | E21B 49/008 73/152.27 |

(Continued)

FOREIGN PATENT DOCUMENTS

| | | |
|---|---|---|
| WO | 2010039317 A1 | 4/2010 |
| WO | 2010085401 A1 | 7/2010 |

OTHER PUBLICATIONS

Godhavn et al. "Drilling seeking automatic control solutions", IFAC World Congress Sep. 2, 2011, pp. 10842-10850. (Year: 2011).*

(Continued)

*Primary Examiner* — Suzanne Lo
(74) *Attorney, Agent, or Firm* — Gilliam IP PLLC

(57) ABSTRACT

During drilling operations various drilling mud properties may be measured and predicted. Uncertainties in the measured or predicted values may also be calculated. The estimated uncertainties may then be used to optimize mud sampling interval and/or control a mud mixer. A decision making algorithm may be performed to optimize a surface mud sampling interval such that the uncertainties are maintained within a bounded region with minimal number of sampling times.

20 Claims, 4 Drawing Sheets

(51) Int. Cl.
*G05B 19/18* (2006.01)
*G05B 17/02* (2006.01)
*E21B 21/08* (2006.01)
*E21B 47/024* (2006.01)
*E21B 47/06* (2012.01)
*G05B 19/042* (2006.01)
*G01V 3/38* (2006.01)

(52) U.S. Cl.
CPC .......... *E21B 47/065* (2013.01); *E21B 49/003* (2013.01); *E21B 49/005* (2013.01); *G05B 17/02* (2013.01); *G05B 19/042* (2013.01); *G05B 19/18* (2013.01); *E21B 21/063* (2013.01); *G01V 3/38* (2013.01); *G05B 2219/23455* (2013.01); *G05B 2219/45129* (2013.01)

(56) References Cited

U.S. PATENT DOCUMENTS

| | | |
|---|---|---|
| 9,206,671 B2 | 12/2015 | Shetty et al. |
| 9,212,538 B2 | 12/2015 | Shetty et al. |
| 9,255,473 B2 | 2/2016 | Burress et al. |
| 2007/0087927 A1 | 4/2007 | Scott et al. |
| 2011/0153296 A1 | 6/2011 | Sadler et al. |
| 2011/0220410 A1* | 9/2011 | Aldred .................. E21B 44/00 175/26 |
| 2012/0024602 A1 | 2/2012 | Larson |
| 2012/0048618 A1 | 3/2012 | Zamanian et al. |
| 2012/0118638 A1 | 5/2012 | Orbell et al. |
| 2014/0202772 A1 | 7/2014 | Kulkarni et al. |
| 2014/0360259 A1* | 12/2014 | Indo ..................... E21B 49/088 73/152.55 |
| 2015/0013968 A1 | 1/2015 | Hsu et al. |
| 2015/0039275 A1 | 2/2015 | Mikhailov et al. |
| 2016/0237810 A1* | 8/2016 | Beaman, Jr. ............ E21B 47/10 |
| 2017/0198536 A1* | 7/2017 | Song ..................... E21B 21/00 |

OTHER PUBLICATIONS

Jain, Praveen. "Downhole depth estimation for automated subsurface navigation", Jul. 8, 2013, Thesis, Delft University of Technology, 76 pages. (Year: 2013).*
ISR/WO for PCT/US2016/042000 dated Oct. 24, 2016.

* cited by examiner

ESTIMATING DRILLING FLUID PROPERTIES AND THE UNCERTAINTIES THEREOF

BACKGROUND

Drilling mud (also referred to as a drilling fluid) is an important component of a drilling operation that, among other things, removes cuttings from the wellbore, controls formation pressures, maintains wellbore stability, and cools and lubricates the drilling equipment. The quality of the drilling mud affects the performance of the drilling process such as rate of penetration as well. Therefore, maintaining the fluid properties at desired levels enhances the efficiency and efficacy of drilling operations. Current methods of monitoring drilling mud properties are typically done by an engineer, who performs tests on samples of the returning fluid typically every 15 minutes. These tests investigate the returning fluid's characteristics and changes in the composition based on knowledge about the formation and the engineer's experience. However, due to uncertainties resulting from measurements, unknown downhole conditions, and time delay, maintaining the desired mud fluid properties is difficult using this in a manual analysis method. Further, because real-time drilling conditions are often not known, the timing of measurements cannot be optimized to account for changing real-time drilling conditions.

BRIEF DESCRIPTION OF THE DRAWINGS

The following figures are included to illustrate certain aspects of the embodiments, and should not be viewed as exclusive embodiments. The subject matter disclosed is amenable to considerable modifications, alterations, combinations, and equivalents in form and function, as will occur to those skilled in the art and having the benefit of this disclosure.

Figure 1:
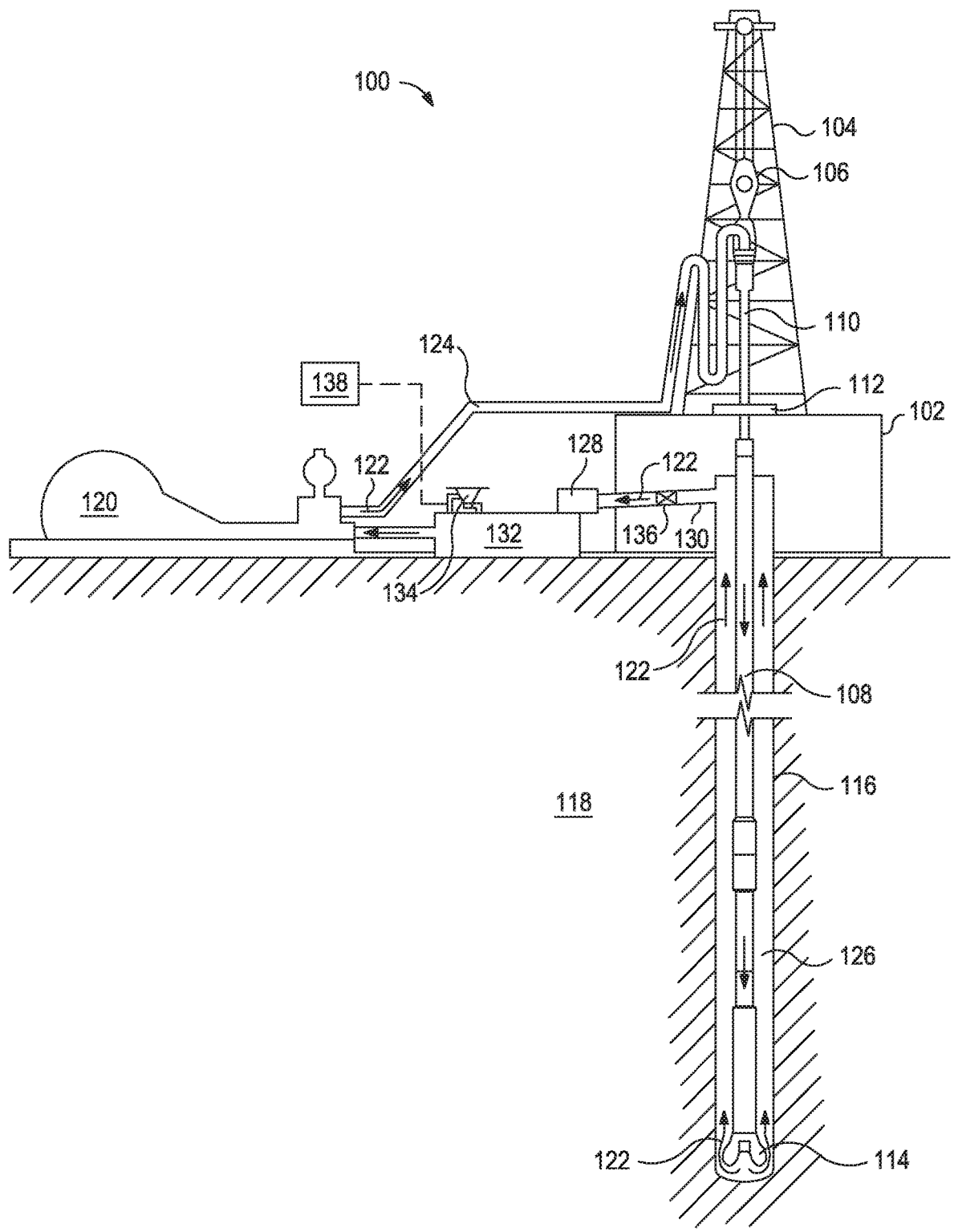
FIG. 1 illustrates an exemplary mud circulation system suitable for implementing the methods described herein.

It should be understood, however, that the specific embodiments given in the drawings and detailed description thereof do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems for enhancing workflow performance in the oil and gas industry. More specifically, the present application relates to methods that calculate and reduce uncertainties of mud property measurements, and use the estimated uncertainties to optimize mud sampling interval and control the mud mixer. The methods described herein estimate the mud property uncertainties using a dynamic model and updates the estimation once measurement data are available. A decision making algorithm is performed to optimize a surface mud sampling interval such that the uncertainties are maintained within a bounded region with minimal number of sampling times. Based on the uncertainty estimation, a robust control algorithm may be designed to adjust the mud mixer operational parameters to achieve a desired drilling mud quality. This disclosure improves the performance of mud measurement and control with greatly reduced costs.

FIG. 1 illustrates an exemplary mud circulation system 100 suitable for implementing the methods described herein. While FIG. 1 generally depicts a land-based drilling assembly, those skilled in the art will readily recognize that the principles described herein are equally applicable to subsea drilling operations that employ floating or sea-based platforms and rigs without departing from the scope of the disclosure.

As illustrated, the mud circulation system 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates mud 122 through a feed pipe 124 and to the kelly 110, which conveys the mud 122 downhole through the interior of the drill string 108 and out through one or more orifices in the drill bit 114. The mud 122 is then circulated back to the surface via an annulus 126 defined between the drill string 108 and the walls of the borehole 116. At the surface, the recirculated or spent mud 122 exits the annulus 126 and may be conveyed through chokes 136 (also referred to as a choke manifold) to one or more mud cleaning unit(s) 128 (e.g., a shaker, a centrifuge, a hydrocyclone, a separator (which may include magnetic and/or electrical separators), a desilter, a desander, a separator, a filter, a heat exchanger, any fluid reclamation equipment, and the like) via an interconnecting flow line 130. After passing through the mud cleaning unit(s) 128, a "cleaned" mud 122 is deposited into a nearby retention pit 132 (e.g., a mud pit or mud tank). While illustrated as arranged at the outlet of the wellbore 116 via the annulus 126, those skilled in the art will readily appreciate that the mud cleaning unit(s) 128 may be arranged at any other location in the mud circulation system 100 to facilitate its proper function without departing from the scope of the disclosure.

At the retention pit 132 (or before or after), the mud circulation system 100 may include one or more mud treatment units. The mud 122 may be treated to change the composition and properties of the mud 122. For example, weighting agents like barite may be added to the mud 122 to increase the weight of the mud 122. In another example, a base fluid may be added to the mud 122 to decrease the weight of the mud 122. In the illustrated mud circulation system 100, the addition and mixing of materials to the mud 122 may be achieved with a mixer 134 communicably coupled to or otherwise in fluid communication with the retention pit 132. The mixer 134 may include, but is not limited to, mixers, hoppers, flow lines, and related mixing equipment known to those skilled in the art. In other embodiments, however, the materials may be added to the mud 122 at any other location in the mud circulation system 100. In at least one embodiment, for example, there could be more than one retention pit 132, such as multiple retention pits 132 in series. Moreover, the retention pit 132 may be representative of one or more fluid storage facilities and/or units where the materials may be stored, reconditioned, and/or regulated until added to the mud 122.

The various components of the mud circulation system 100 may further include one or more sensors, gauges, pumps, compressors, and the like used store, monitor, regulate, convey, and/or recondition the exemplary muds 122 (e.g., sensors and gauges to measure the composition and/or pressure of the mud, compressors to change the pressure of the mud, and the like).

While not specifically illustrated herein, the disclosed mud circulation system 100 may further include drill collars, mud motors, downhole motors and/or pumps associated with the drill string 108, MWD/LWD tools and related telemetry equipment, sensors or distributed sensors associated with the drill string 108, downhole heat exchangers, valves and corresponding actuation devices, tool seals, packers and other wellbore isolation devices or components, and the like. The mud circulation system 100 may also further include a control system 138 communicably coupled to various components of the mud circulation system 100 (e.g., the mixer 134, a downhole motor, sensors, and the like) and be capable of executing the mathematical algorithms, methods, and drilling system control described herein.

The methods presented herein use a model-based approach to estimate the uncertainties of drilling mud properties. Based on this estimation, the surface mud sampling interval may be balanced with uncertainty boundaries in an optimal way so that mud measurements are performed only as necessary instead of in a regular interval. This approach may save time and costs. Further, the uncertainty analysis may be used for designing a robust mud mixing controller capable of maintaining more consistent drilling mud properties.

Uncertainty Estimation:

The properties of a drilling mud may be used to reveal how the fluid behaves in the mud circulation system 100. Two important properties of the drilling mud are mud weight and viscosity. Mud weight (or weight of the mud) is defined as weight per unit volume (e.g., pounds per gallon). Many drilling operations use drilling mud with a mud weight above a minimum mud weight needed to counter the pore pressure of the formation. However, excessive mud weight will reduce the rate of penetration and thereby increase drilling cost. The viscosity of a fluid may be used to reveal how the fluid resists gradual deformation by shear stress or tensile stress. The viscosity also affects the productivity and mobility ratios of the drilling mud in recovery.

The mud weight dynamics may be modeled by the following discrete-time state-space equations after appropriate space discretization and approximation (viscosity and other fluid properties could be modeled in a similar way):

$$x(k+1)=Ax(k)+Bu(k)+w(k)$$

$$y(k)=Cx(k)+v(k) \quad \text{Equation (1)}$$

where the input $u(k)$ denotes the amounts of the chemicals added to the drilling mud at the mixer 134, $w(k)$ and $v(k)$ are the white process and measurement noise, respectively, the state $x(k)$ represents the internal state of the system, which usually cannot be measured directly, the output $y(k)$ denotes densities at different locations of interest (e.g., at the inlet and outlet of the retention pit 132), and A, B, and C are system matrices that represents the internal dynamics.

As used herein, the term "white process and measurement noise" refers to the process noise $w(k)$ and measurement noise $v(k)$ observed with Gaussian distribution. As used herein, the term "non-white process and measurement noise" refers the process noise $w(k)$ and measurement noise $v(k)$ observed with some distribution other than Gaussian distribution.

A time delay may also be included in Equation (1), which may be useful in the calculations and methods relating to circulating drilling mud dynamics. The dynamics of the non-white process and measurement noise are included in the state-space Equation (1). More specifically, the system matrix A is further divided into two parts: the deterministic part $A_d$ describing system dynamics and the stochastic part $A_s$ describing the noise dynamics.

$$A = \begin{bmatrix} A_d & \\ & A_s \end{bmatrix} \quad \text{Equation (2)}$$

Accordingly, the internal state consists of two parts:

$$x = \begin{bmatrix} x_d \\ x_s \end{bmatrix} \quad \text{Equation (3)}$$

An observer is used to estimate the system dynamics and noise dynamics according to Equation (5), where the hat (^) indicates an estimation of the given operator.

$$\hat{x}(k+1)=A\hat{x}(k)+Bu(k)$$

$$\hat{y}(k)=C\hat{x}(k) \quad \text{Equation (5)}$$

Since $\hat{x}$ (the estimation of the internal state of the system) is just an estimate, it has estimation error as compared to the true value x. All the following Equations (6)-(8) describe how the estimation error (or "uncertainty") is calculated. The uncertainty matrices of the state of output are given by:

$$\Sigma_x(k+1)=A\Sigma_x(k)A^T+W$$

$$\Sigma_y(k)=C\Sigma_x(k)C^T+V \quad \text{Equation (6)}$$

where $\Sigma_x$ is the uncertainty matrix for state estimate $x(k)$ and $\Sigma_y$ is the uncertainty matrix for output $y(k)$, and W and V are covariance matrices for white process noise $w(k)$ and measurement noise, respectively.

The covariance matrices W and V may be approximated based on historical or real-time sampling data using estimation methods such as Bayesian, maximum likelihood, covariance matching, and correlation techniques.

Figure 2:
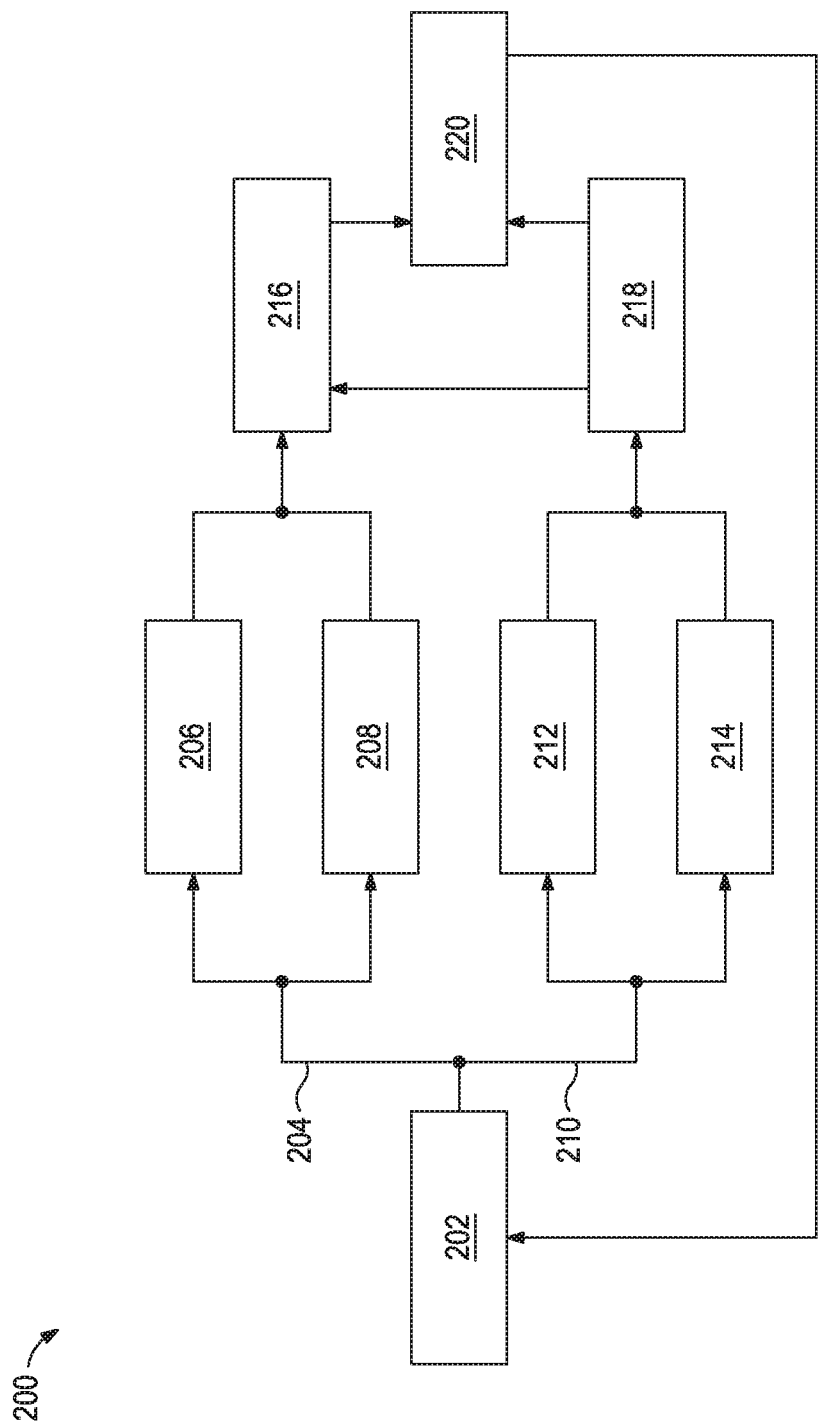
FIG. 2 illustrates an uncertainty modeling flow chart.

FIG. 2 illustrates a flow chart of an exemplary uncertainty model 200. First, the logic question 202 "Are measurement data available?" is asked. If yes 204, then the state estimate $x(k)$ and the uncertainty matrices $\Sigma_x$ are updated, illustrated as blocks 206 and 208, respectively. Updating the state estimate $x(k)$ (block 206) may be according to Equation (7) where vector K is the Kalman gain.

$$\hat{x}(k+1)=A\hat{x}(k)+Bu(k)+K[y(k)-\hat{y}(k)]$$

$$\hat{y}(k)=C\hat{x}(k) \quad \text{Equation(7)}$$

Different from Equation (5), which is an open loop estimate, Equation (7) utilizes the residual between current output estimate and actual output measurement to correct the estimates for the next step. The vector K determines how much of the prediction error $y(k)-\hat{y}(k)$ is used to corrected the state estimate. Qualitatively speaking, the value of K is large when the white noise level is small, and the model 200 relies more heavily on the measurement value to correct the estimated state. Conversely, the value of K is small when the noise level is high, and the model use less measurement value to correct the estimated state. The optimal value of K may be calculated if the noise covariance is known or can be estimated.

Updating the uncertainty matrices $\Sigma_x$ (block 208) may be according to Equation (8).

$$\Sigma_x(k+1) = A\Sigma_x(k)A^T + W - A\Sigma_x(k)C^T(C\Sigma_x(k)C^T+V)^{-1}C\Sigma_x(k)A^T$$

$$\Sigma_y(k) = C\Sigma_x(k)C^T + V(k) \qquad \text{Equation(8)}$$

By using the measurement data, the uncertainties of state and output estimates may be greatly reduced. As compared to the traditional cone-type model, Equation (1) suggests that the growth of uncertainty is a bounded dynamics plus linear drift. After taking a measurement, the uncertainty may be reduced but not become 0 as a result of sensor noise.

Equation (7) assumes a linear system and a constant matrix for A and C. If the system dynamics are highly nonlinear, the system may be represented in a nonlinear form according to Equation (9) in either block 206 and 212 and the matrices A and C according to Equation (10).

$$x(k) = f(x(k-1), u(k-1)) + w(k-1)$$

$$y(k) = h(x(k)) + v(k) \qquad \text{Equation (9)}$$

Linearization around the operating point is used to approximate the nonlinear dynamics within a small neighborhood of the point. At each time step k, matrices A(k) and C(k) are linearized from f(x, u) and h(k) per Equation (10).

$$A(k) = \left.\frac{\partial f}{\partial x}\right|_{\hat{x}(k-1), u(k-1)} \qquad \text{Equation (10)}$$

$$C(k) = \left.\frac{\partial h}{\partial x}\right|_{\hat{x}(k-1)}$$

Extended Kalman filter, unscented Kalman filter or other nonlinear filtering techniques could be used to estimate the state and output of the nonlinear system of Equation (9), as well as the uncertainty matrices $\Sigma_x$ and $\Sigma_y$.

As illustrated in FIG. 2, when the answer is no 210 to the logic question 202 then the state estimate x(k) and the uncertainty matrices $\Sigma_x$ (blocks 212 and 214, respectively) may be updated per Equation (6).

Then, the updated state estimate x(k) (from either block 206 and 212) may be used to determine adjustments the mud mixer operational parameters (illustrated at block 216) to achieve a desired drilling mud quality. The uncertainty matrices $\Sigma_x$ (from either block 208 and 214) may be used to determine the error covariance 218 of the system. Then, the adjustments (block 216) and corresponding error covariance 218 may be applied to the system (illustrated at block 220).

Mud Sampling Optimizer:

mud (e.g., mud weight and viscosity) may be measured in 15 minute intervals. However, if the measurement uncertainty grows beyond an expected bound, frequent measurements may be taken (e.g., in two to five minute intervals). For example, for high angle drilling, highly deviated formations or slim wellbores, the window between the pore pressure and fracture gradient narrows where more reliable mud weight measurements may be needed to control the equivalent circulating density (ECD). In this case, mud weight measurements may be taken more often every 15 minutes (e.g., in 5 minute intervals). In contrast, if the uncertainty changes slowly or the desired uncertainty range is large, sampling intervals may be longer than 15 minutes (e.g., in 20 minute to 1 hour intervals). Therefore, it is cost-efficient to take the measurements only when it is necessary, depending on the real-time drilling conditions. In some instances, a mud sampling optimizer may be implemented that balances the sampling interval, economic cost, and uncertainty bounds required for drilling property control. Then, the decision by the mud sampling optimizer may be formulated according to Equation (11).

$$\min J = \sum_{k=1}^{N} \sum_{i=1}^{m} C_i(k) \qquad \text{Equation (11)}$$

s.t. $C_i(k) =$ $$\begin{cases} V, & \text{if } \sum_{total} > \sum_{max}(k) \text{ (take measurements)} \\ 0, & \text{if } \sum_{total} \leq \sum_{max}(k) \text{ (don't take measurements)} \end{cases}$$

$$\sum_{total}(k) = \sum_{i=1}^{n} W_i(k) \cdot \sum_y^i(k)$$

$W_i(k) = f(\text{drilling dynamics, formation, wellbore})$ $\sum_{max}(k) = g(\text{drilling dynamics, formation, wellbore})$ The optimization problem aims to minimize the total cost associated with all the drilling mud property measurements over a time period $[t_1, \ldots, t_N]$. At each time step k, $\Sigma_{total}(k)$ is the total uncertainty defined as a weighted summary of $\Sigma_y^i(k)$, which is the error variance of $i^{th}$ element out of m measurements. If the total uncertainty exceeds the uncertainty limit $\Sigma_{max}(k)$, a drilling mud measurement is taken, with an associated cost of V. Otherwise, there is no mud sampling. The weighting coefficient (k) and uncertainty limit $\Sigma_{max}(k)$= are both functions of real-time drilling conditions such as drilling dynamics, formation, and wellbore changes. For example, when the window between the pore pressure and fracture gradient narrows, a large weighting coefficient on the mud weight measurement may be required for a fine mud weight control. In horizontal directional drilling, a large weighting coefficient on the viscosity measurement may be required to achieve a satisfying viscosity control performance.

Drilling Mud Property Control:

Robust control design may be performed to control the system with uncertainty. The fundamental idea of robust control method is to model the uncertain system as a combination of a nominal model P and uncertainty $\Delta$. The nominal model P characterizes the nominal system dynamics with no uncertainty, and $\Delta$ represents uncertain parameters or disturbances within some region. The open loop singular values of the nominal system is inspected and shaped by the pre- and/or post-compensation weighting functions $W_1$ and $W_2$ to achieve robust performance and/or stability, in the presence of bounded uncertainty. Generally speaking, the open loop gain is designed to be high over low frequency via $W_1$ for the system to better follow the reference signal or better reject the disturbances. In high frequency range, the open loop gain is designed to be low via $W_2$ for the system to reject high frequency unmodeled dynamics and measurement noises. A stabilizing controller K is designed using $H_\infty$ synthesis to achieve desired stability margin. The systematic robust control design procedure could be applied to the mud mixer for drilling mud property control. In one embodiment, a physical-based or data-driven nominal model characterizing mud weight change at a certain location with respect to feeding rates of different chemicals is created in Equation (1). Equation (1) may include parameters and time delay to be adaptively adjusted based on real-time data. The uncertainty $\Delta$ is estimated using Equations (6) or (8) depending on whether real-time measurement data are available. A robust controller K is then designed to increase the probability that the desired mud weight is reached even though there are uncertainties resulting from measurement, unknown downhole conditions, time delay, and hard-to-model chemical reactions. Other fluid properties such as viscosity and temperature can be controlled in a similar way.

Figure 3:
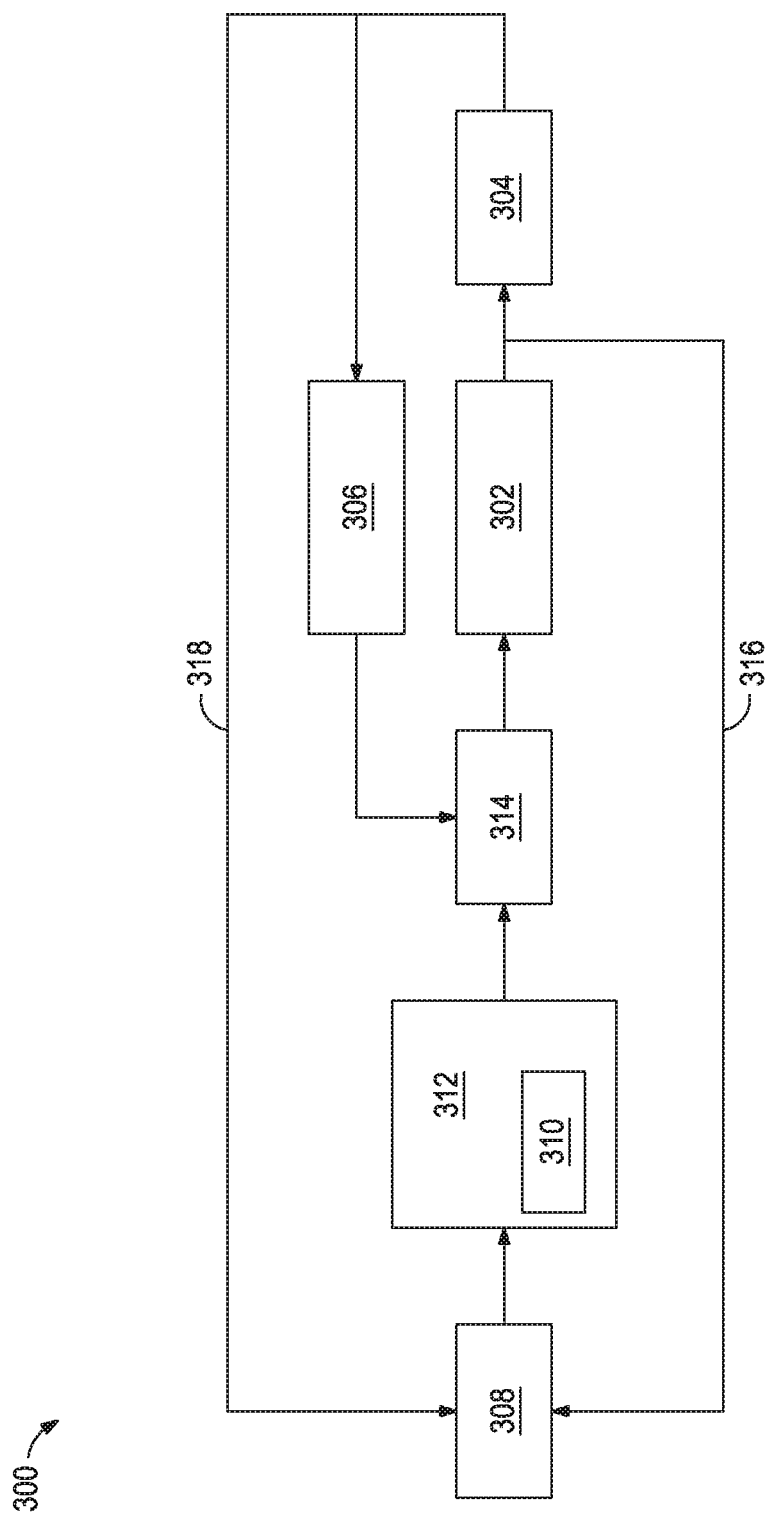
FIG. 3 illustrates an overall drilling mud property control architecture including model identification and prediction, uncertainty estimation, mud sampling optimizer, and robust control design.

Control Architecture:

FIG. 3 illustrates an overall drilling mud property control architecture 300 including model identification and prediction module 302, uncertainty estimation module 304, mud sampling optimizer module 306, and robust control design module 308. The control architecture 300 or individual modules thereof may be implemented and optimized for controlling the mud mixer 310 (e.g., mud mixer 134 of FIG. 1) of the mud circulation system 312 (e.g., mud circulation system 100 of FIG. 1).

Figure 4:
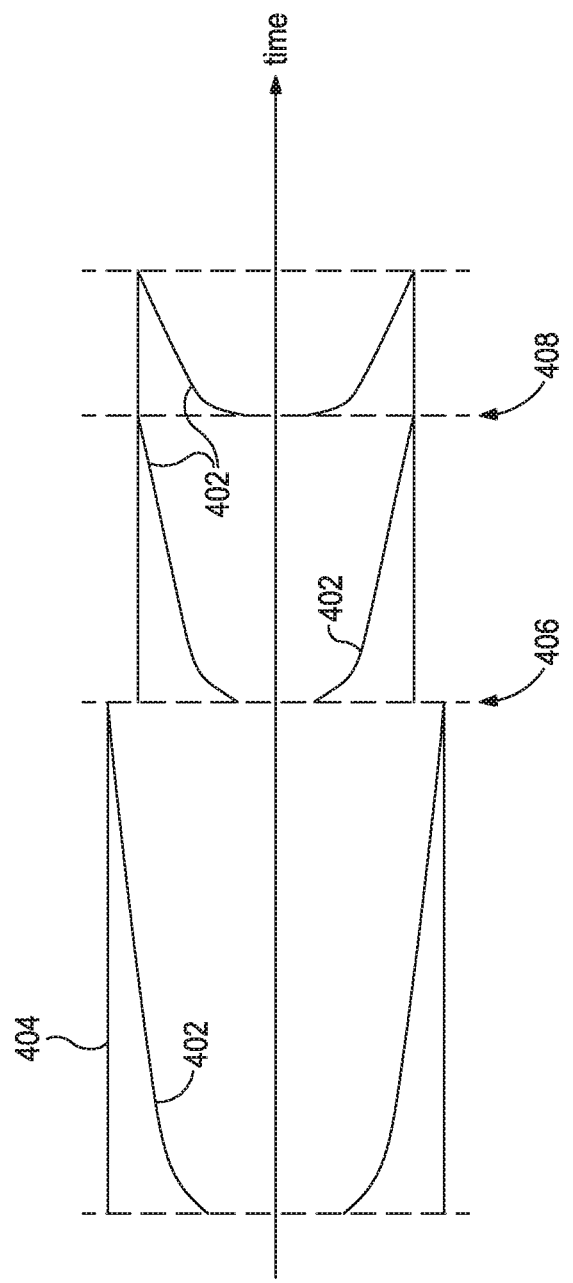
FIG. 4 provides an illustrative example of the mud sampling optimizer module dynamically adjusting the mud sampling interval according to the uncertainty estimates.

The description of each module is as follows:
1) The model identification and prediction module 302 identifies and predicts the drilling mud dynamics such as mud weight and viscosity changes, as well as the uncertainty dynamics. An initial model created based on historical data is used, but as new mud measurement data 314 is collected from sensors in the mud circulation system 312, the module 302 may adjust the initial model adaptively to capture the real-time dynamics and time delay. The model identification and prediction module 302 generates a predicted dynamic model 316 that is sent to the robust control design module 308.
2) The uncertainty estimation module 304 uses the uncertainty model provided by the model identification and prediction module 302 to estimate the uncertainty matrices 318 at the current time step. As described in FIG. 2, if there are no real-time measurement data, the uncertainty matrices evolves as described by Equation (6). If measurements are available, the module estimates uncertainty matrices based on Equation (8). Generally speaking, the uncertainty drops to a very low value immediately after a measurement and grows toward a bound as time passes.
3) The mud sampling optimizer module 306 dynamically adjusts the mud sampling interval according to the uncertainty estimates. An illustrative example is shown in FIG. 4. Initially, the rig is drilling vertically so the uncertainty 402 grows slowly until it reaches the uncertainty limit 404 ($\Sigma_{max}(k)$). As a result, another sample 406 is taken which brings the uncertainty back to a small value. Then, the drilling path becomes horizontal, which requires a smaller uncertainty limit 404 for accurate fluid property control. As illustrated, the sampling interval decreases due to the reduced uncertainty limit 404. After yet another sample 408, the trajectory enters a new formation, resulting in a fast-growing uncertainty and thus, an even smaller sampling interval. This example illustrates how the mud sampling interval may be optimized over real-time drilling conditions.
4) The predicted dynamic model 316 generated by the model identification and prediction module 302, together with the uncertainty 318 estimated by the uncertainty estimation module 304, is fed into the robust control design module 308. The performance specifications may include downhole disturbance rejection and effectively tracking a desired or optimum flow rate in the presence of uncertainty, etc. The robust control design module 308 regulates the feeding rates of different chemicals at the mud mixer 310 such that desired drilling mud properties are achieved (e.g., for the current the drilling parameters and conditions).

The control system(s) described herein and corresponding computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Some embodiments may include a method comprising: circulating a drilling mud through a mud circulation system; determining a model of drilling mud property dynamics; measuring a first value for a drilling mud property at a first time; calculating an uncertainty of the first value at a second time; and measuring a second value for the drilling mud property once the uncertainty of the second value is greater than an uncertainty limit. Some embodiments may include a method comprising: circulating a drilling mud through a mud circulation system; determining a model of drilling mud property dynamics; measuring a first value for a drilling mud property at a first time; estimating changes in drilling parameters and conditions, thereby providing estimated drilling parameters and conditions; calculating an uncertainty of the value at a second time; and changing the drilling mud property based on the uncertainty of the value and the estimated drilling parameters and conditions. The foregoing methods may further include, unless already provided for: (1) changing the drilling mud property based on the uncertainty and the drilling parameters and conditions; (2) wherein changing the drilling mud property involves regulating a feed rate of a chemical into the drilling mud; (3) wherein changing the drilling mud property involves regulating a feed rate of water into the drilling mud; (4) wherein changing the drilling mud property involves regulating a disposal rate of the drilling mud; (5) wherein the drilling mud property is mud weight; (6) wherein the drilling mud property is temperature; or (7) wherein the drilling mud property is viscosity.

Embodiments described herein include Embodiments A, B, C, and D.

Embodiment A is a method comprising: circulating a drilling mud through a mud circulation system; determining a model of drilling mud property dynamics; measuring a first value for a drilling mud property at a first time; calculating an uncertainty of the first value at a second time; and measuring a second value for the drilling mud property once the uncertainty of the second value is greater than an uncertainty limit.

Embodiment A may optionally include one or more of the following: Element 1: the method further comprising changing the drilling mud property based on the uncertainty and, optionally, drilling parameters and conditions; Element 2: estimating changes in drilling parameters and conditions, thereby providing estimated drilling parameters and conditions; and changing the drilling mud property based on the uncertainty of the value and the estimated drilling parameters and conditions; Element 3: Element 1 or 2 and wherein changing the drilling mud property involves regulating a feed rate of a chemical into the drilling mud; Element 4: Element 1 or 2 and wherein changing the drilling mud property involves regulating a feed rate of water into the drilling mud; Element 5: Element 1 or 2 and wherein changing the drilling mud property involves regulating a disposal rate of the drilling mud; Element 6: wherein the drilling mud property is mud weight; Element 7: wherein the drilling mud property is temperature; Element 8: wherein the drilling mud property is viscosity.

Exemplary combinations include, but are not limited to, Element 1 or 2 in combination with two or more of Elements 3-5 and optionally one or more of Elements 6-8; two or more of Elements 6-8 combination; and Element 1 or 2 in combination with one or more of Elements 6-8.

Embodiment B is a method comprising: circulating a drilling mud through a mud circulation system; determining a model of drilling mud property dynamics; measuring a first value for a drilling mud property at a first time; estimating changes in drilling parameters and conditions, thereby providing estimated drilling parameters and conditions; calculating an uncertainty of the value at a second time; and changing the drilling mud property based on the uncertainty of the value and the estimated drilling parameters and conditions.

Embodiment B may optionally include one or more of the following: Element 6; Element 7; Element 8; Element 9: wherein changing the drilling mud property involves regulating a feed rate of a chemical into the drilling mud; Element 10: wherein changing the drilling mud property involves regulating a feed rate of water into the drilling mud; Element 11: wherein changing the drilling mud property involves regulating a disposal rate of the drilling mud; and Element 12: wherein the drilling parameters and conditions includes at least one of: lithology of a subterranean formation drilling through, trajectory of a drill bit, drilling mud flow rate, drilling mud weight, drilling mud temperature, or drilling mud viscosity. Exemplary combinations include, but are not limited to, two or more of Elements 6-8 in combination; one or more of Elements 6-8 in combination with one or more of Elements 9-12; and two or more of Elements 9-12 in combination.

Embodiment C is a mud circulation system comprising: a drill string within a wellbore penetrating a subterranean formation; a pump configured to convey drilling mud through the drill string and the wellbore; a sensor coupled to the system to measure a drilling condition; a non-transitory computer-readable medium coupled to the drill string, the pump, or both and encoded with instructions that, when executed, cause the mud circulation system to perform a method according to Embodiment A or Embodiment B (including any optional elements described herein).

Embodiment D is a non-transitory computer-readable medium encoded with instructions that, when executed, cause a mud circulation system to perform a method according to Embodiment A or Embodiment B (including any optional elements described herein).

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The following is claimed:

1. A method comprising:
   circulating a drilling mud through a mud circulation system;
   determining a model of drilling mud property dynamics;
   measuring a first value for a drilling mud property at a first time;
   calculating an uncertainty of the first value at a second time; and
   measuring a second value for the drilling mud property once the uncertainty of the first value is greater than an uncertainty limit.

2. The method of claim 1 further comprising: changing the drilling mud property based on the uncertainty.

3. The method of claim 1 further comprising: estimating changes in drilling parameters and conditions, thereby providing estimated drilling parameters and conditions; and changing the drilling mud property based on the uncertainty of the value and the estimated drilling parameters and conditions.

4. The method of claim 2, wherein changing the drilling mud property involves regulating a feed rate of a chemical into the drilling mud.

5. The method of claim 2, wherein changing the drilling mud property involves regulating a feed rate of water into the drilling mud.

6. The method of claim 2, wherein changing the drilling mud property involves regulating a disposal rate of the drilling mud.

7. The method of claim 3, wherein the drilling parameters and conditions includes at least one of: lithology of a subterranean formation drilling through, trajectory of a drill bit, drilling mud flow rate, drilling mud weight, drilling mud temperature, or drilling mud viscosity.

8. The method of claim 1, wherein the drilling mud property is mud weight.

9. The method of claim 1, wherein the drilling mud property is temperature.

10. The method of claim 1, wherein the drilling mud property is viscosity.

11. A mud circulation system comprising:
    a drill string within a wellbore penetrating a subterranean formation;
    a pump configured to convey drilling mud through the drill string and the wellbore;
    a sensor coupled to the system to measure a drilling condition;
    a non-transitory computer-readable medium coupled to the drill string, the pump, or both and encoded with instructions that, when executed, cause the system to perform a method comprising:
    circulating a drilling mud through the mud circulation system;
    determining a model of drilling mud property dynamics;
    measuring a first value for a drilling mud property at a first time;
    calculating an uncertainty of the first value at a second time; and
    measuring a second value for the drilling mud property once the uncertainty of the first value is greater than an uncertainty limit.

12. The mud circulation system of claim 11, wherein the method further comprises: changing the drilling mud property based on the uncertainty.

13. The mud circulation system of claim 11, wherein the method further comprises: estimating changes in drilling parameters and conditions, thereby providing estimated drilling parameters and conditions; and changing the drilling mud property based on the uncertainty of the value and the estimated drilling parameters and conditions.

14. The mud circulation system of claim 12, wherein changing the drilling mud property involves regulating a feed rate of a chemical into the drilling mud.

15. The mud circulation system of claim 12, wherein changing the drilling mud property involves regulating a feed rate of water into the drilling mud.

16. The mud circulation system of claim 12, wherein changing the drilling mud property involves regulating a disposal rate of the drilling mud.

17. The mud circulation system of claim 13, wherein the drilling parameters and conditions includes at least one of: lithology of a subterranean formation drilling through, trajectory of a drill bit, drilling mud flow rate, drilling mud weight, drilling mud temperature, or drilling mud viscosity.

18. The mud circulation system of claim 11, wherein the drilling mud property is selected from the group consisting of: mud weight, mud temperature, and mud viscosity.

19. A non-transitory computer-readable medium encoded with instructions that, when executed, cause a mud circulation system to perform a method comprising:
    circulating a drilling mud through the mud circulation system;
    determining a model of drilling mud property dynamics;
    measuring a first value for a drilling mud property at a first time;

calculating an uncertainty of the first value at a second time; and measuring a second value for the drilling mud property once the uncertainty of the first value is greater than an uncertainty limit.

20. The non-transitory computer-readable medium of claim 19, wherein the method further comprises: estimating changes in drilling parameters and conditions, thereby providing estimated drilling parameters and conditions; and changing the drilling mud property based on the uncertainty of the value and the estimated drilling parameters and conditions.

\* \* \* \* \*